United States Patent
Cipriani (10) Patent No.: US 6,884,947 B2
(45) Date of Patent: Apr. 26, 2005

(54) APPARATUS AND METHOD FOR THE CHECKING OF FORCES

(75) Inventor: Riccardo Cipriani, Ferrara (IT)

(73) Assignee: Marposs Societa per Azioni (IT)

( * ) Notice: Subject to any disclaimer, the term of this patent is extended or adjusted under 35 U.S.C. 154(b) by 193 days.

(21) Appl. No.: 10/311,892

(22) PCT Filed: Jul. 6, 2001

(86) PCT No.: PCT/EP01/07793

§ 371 (c)(1), (2), (4) Date: Dec. 23, 2002

(87) PCT Pub. No.: WO02/06782

PCT Pub. Date: Jan. 24, 2002

(65) Prior Publication Data

US 2004/0011571 A1 Jan. 22, 2004

(30) Foreign Application Priority Data

Jul. 14, 2000 (IT) .................................. BO2000A0428
Oct. 23, 2000 (IT) .................................. BO2000A0615

(51) Int. Cl.$^7$ ................................................. G01N 3/00
(52) U.S. Cl. .......................... 177/245; 73/800; 73/841; 73/849
(58) Field of Search ........................... 177/245; 73/800, 73/841, 849

(56) References Cited

U.S. PATENT DOCUMENTS

| | | | |
|---|---|---|---|
| 3,686,939 A | * 8/1972 | Fuchs et al. | 369/53.38 |
| 4,263,810 A | * 4/1981 | Chiu | 73/800 |
| 4,825,968 A | 5/1989 | Maaz et al. | 177/212 |
| 5,097,713 A | * 3/1992 | Kurz | 73/849 |
| 5,245,872 A | 9/1993 | Cooper et al. | 73/161 |
| 6,166,336 A | * 12/2000 | Odiet | 177/210 R |

FOREIGN PATENT DOCUMENTS

| | | |
|---|---|---|
| JP | 11216645 | 8/1999 |
| WO | WO 00/16056 A1 | 3/2000 |

* cited by examiner

Primary Examiner—Randy W. Gibson
(74) Attorney, Agent, or Firm—Dickstein Shapiro Morin Oshinsky LLP (57) ABSTRACT

An apparatus and a method for measuring the force (GL) applied by an elastically flexible element (5;71,71') undergoing a pre-set elastic deformation, more specifically an element that carries a slider (3) and includes a thrust device that applies a force to the flexible element. The thrust device includes, for instance, a pneumatic nozzle (27;57,57';28) for applying a force (R) to an intermediate portion (4) of the thin plate, at a thrust section (K). A position sensor (30;80) detects the height (z) of the slider—indicative of the deformation of the flexible element. The value (MF) of the moment of the applied torque when the height (ZF) of the slider indicates the pre-set elastic deformation of the flexible element, is utilized for calculating the force to be measured according to the formula GL=MF/L where L is the distance separating the slider from the section of weakness.

25 Claims, 4 Drawing Sheets

APPARATUS AND METHOD FOR THE CHECKING OF FORCES

TECHNICAL FIELD

The present invention relates to an apparatus for checking the force applied by a thin plate including a locking portion, stationary with respect to a reference base, a section of weakness near the locking portion, an intermediate portion and a free end carrying a slider, including a support, coupled to the reference base, a thrust device, coupled to the support and adapted for applying a reference force to the thin plate, substantially along a thrust direction, at a thrust section, detecting devices with at least a position sensor, and a memorizing, processing and control unit connected to the position sensor and adapted to detect, on the basis of the signals of the position sensor, the mutual position, along the thrust direction, existing between the locking portion and the slider, and process a value of the force to be checked on the basis of the value of the reference force and of the position of the thrust section at a pre-determined mutual position along the thrust direction.

The invention also relates to a method for measuring a force generated by a thin plate at a pre-set elastic deformation, the thin plate having a locking portion, stationary with respect to a reference base, a section of weakness near the locking portion, an intermediate portion and a free end carrying a slider, the method including the steps of applying a force to the thin plate along a thrust direction, and detecting the occurrence of a pre-determined mutual position, along the thrust direction and as a consequence of the force applied, between the locking portion and the slider, the mutual position defining the elastic deformation of the thin plate.

BACKGROUND ART

The embodiments described and illustrated for exemplary purposes in international patent application published with No. WO-A-0016056, filed by the same applicant of the present patent application, include the above features.

In the hard disk memorizing units of electronic processors, generally the hard disk is a structure including a certain number of magnetic disks, aligned on a rotating spindle, capable of memorizing information in sectors arranged on concentric paths on both sides.

Read/write devices include magnetic heads carried by supports that enable all the heads to simultaneously cooperate with their associated disk surfaces.

More specifically, each head is coupled to a slider which is in turn coupled to a gimbal located at the end of a suspension arm. All the suspension arms are coupled, at their coupling ends opposite those carrying the magnetic heads, to an E-block actuator that includes a number of reciprocally parallel wings, typically exceeding by one the number of magnetic disks of the hard disk. The assembly consisting of the E-block actuator and of the suspension arms carrying the magnetic heads is commonly referred to as an HSA ("head stack assembly").

In the course of the read/write operations in the memorizing unit, electric motors cause a rotational displacement of the HSA that displaces the magnetic heads towards their associated disk surfaces and the subsequent axial rotations of the spindle carrying the disks. The rotation of the hard disk and the specific shape of the sliders carrying the heads determine that between the disks and the sliders there be generated air bearings that urge the magnetic heads away from their associated disk surfaces. The thrust of the air bearings is counteracted by the force ("gram load") applied by the suspension arms, that contributes to defining the flying height of the slider, in other terms, the distance between the slider and the surface of the magnetic disk in the course of the rotation of the latter. The typical flying height values in the present day units are within the range from 25 to 50 nanometers.

For the purpose of correctly accomplishing the read/write operations on the hard disk, the maintaining of a flying height at a pre-set and substantially constant value is a particularly critical aspect of the memorizing unit. Thus, the gram load value, that can vary, typically in the range from 1 to 5 grams with tolerances in the order of a few tenths of a gram, must be defined and checked with great attention.

The embodiments described and illustrated in the herein mentioned patent application published with No. WO-A-0016056 foresee thrust devices with levers including flat rest surfaces that cooperate with their associated thin plates by contacting the sliders carrying the magnetic heads. The sliding of each slider on its associated rest surface, in the course of the horizontal displacements of the lever, may damage the magnetic head carried by the slider, or in any case wear out the slider, even if the involved forces are extremely small.

Furthermore, these embodiments disclose the indirect detecting of height values of the slider by checking the position of the end of the lever that is in contact with the slider. Although this method may be in general accurate and reliable, it does not enable to check in a direct way the actual position of the slider, and may provide incorrect results in the event, for example, foreign matter were to deposit between the slider and the lever rest surface.

DISCLOSURE OF INVENTION

Object of the present invention is to overcome the conditions that could give rise to these problems.

This and other objects are achieved by an apparatus and a checking method according to claims 1 and 21, respectively. Furthermore, the apparatus and the method according to the invention provide the advantages of the apparatuses described and illustrated in the former international patent application published with No. WO-A-0016056 and enable to implement applications that are identical insofar as, for example, the achieving of structures for the simultaneous checking of a plurality of thin plates fixed to a single E-block are concerned.

BRIEF DESCRIPTION OF THE DRAWINGS

The invention is now described in more detail with reference to the enclosed sheets of drawings, given by way of non-limiting example, wherein.

BEST MODE FOR CARRYING OUT THE INVENTION

Figure 1:
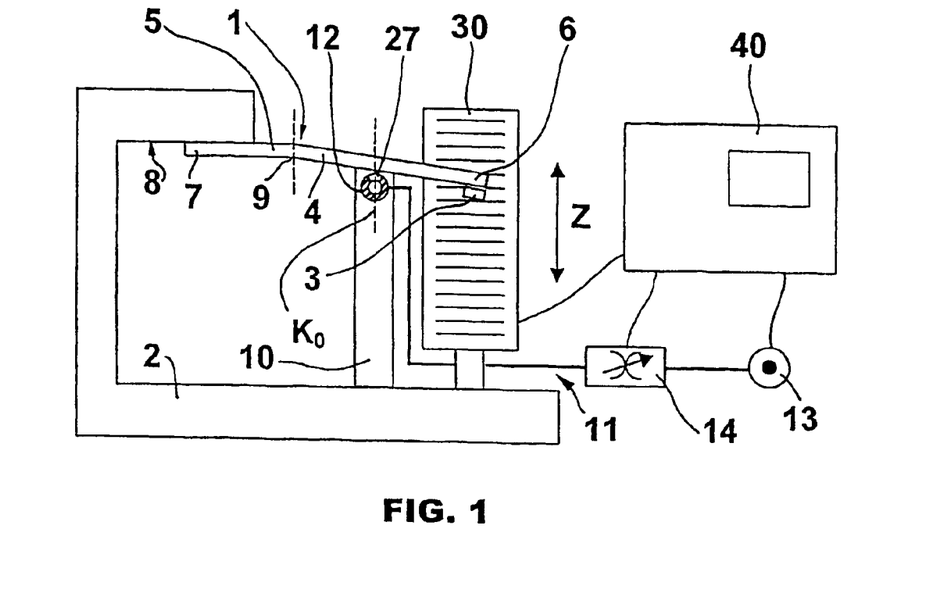
FIG. 1 is a schematic side view of an apparatus according to a first preferred embodiment of the invention.
Figure 2:
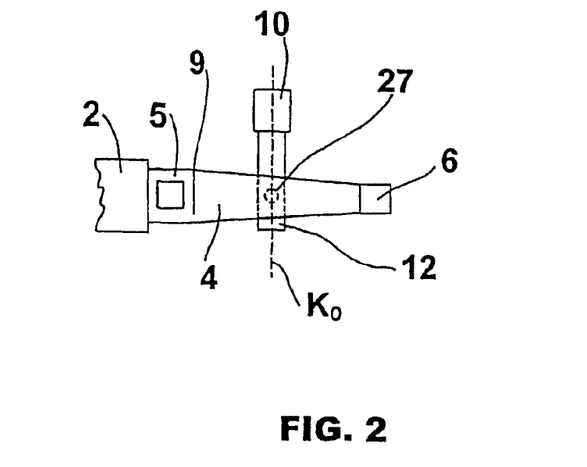
FIG. 2 is a top view showing some details of the apparatus of FIG. 1.

FIGS. 1 and 2 show, in a schematic way, an elastic element 1, for example an HGA ("head gimbal assembly") of a known type, coupled to a reference base 2, and including a suspension arm consisting in a thin plate 5 that has a free end 6 with a slider 3. The slider 3 carries a magnetic head and is coupled to thin plate 5 by means of a gimbal. For the sake of simplicity and clarity, the magnetic head and the gimbal are not shown in the drawings. Furthermore, thin plate 5 has a locking portion 7 coupled to a reference surface 8 of base 2, a section of weakness 9 of thin plate 5 and an intermediate portion 4.

A support 10, coupled to reference base 2, carries a thrust device with a pneumatic nozzle 27 achieved, for example, in the end part of a tubular element 12 and coupled to a pneumatic circuit, identified by reference number 11, that includes known components, like conduits and throttle elements. With regard to these components and for the sake of simplicity and clarity, FIG. 1 shows just a source of compressed air 13 and a control device with a pressure regulator 14, for controlling the pressure of the air supplied by source 13.

Support 10 and tubular element 12 are arranged in such a way that, in the working condition shown in FIG. 1, the nozzle 27 faces thin plate 5 in a thrust section $K=K_o$ of the intermediate portion 4. More specifically, nozzle 27 is oriented in such a way as to apply a force to thin plate 5, along a thrust direction Z, at a position corresponding to said thrust section $K_o$.

Detecting devices include a position sensor, shown in a schematic way and identified by reference number 30 in FIG. 1, that is coupled to reference base 2 and generates electric signals indicative of the position, along the vertical thrust direction Z, of slider 3 with respect to reference surface 8 to which element 1 is coupled. The sensor 30 can be achieved by utilizing an optoelectronic measuring system, for example of the known shadow casting type with a device for emitting infrared radiations and a photodetector of the CCD type ("Charge Coupled Device"), like the one disclosed in International patent application published under the PCT with No. WO-A-9924785 filed by the same applicant of the present patent application.

A memorizing, processing and control unit 40 is connected to the source of compressed air 13, to pressure regulator 14 and position sensor 30.

The apparatus shown in FIGS. 1 and 2 enables to calculate the force value ("gram load") $G_L$ applied by HGA 1 at a preset elastic deformation of thin plate 5 at which a flying height $z_F$ of slider 3 takes place, in other terms at a predetermined difference in height along the thrust direction Z between slider 3 and locking portion 7 of thin plate 5, a difference in height that is detected on the basis of the signal of the position sensor 30.

A checking method that utilizes the apparatus shown in FIGS. 1 and 2 is the following.

Before the checking operations are carried out, there are removable abutments that keep thin plate 5 in a retracted position. Further to the removal of the abutments (not shown in the figures), the surface of tubular element 12 and thin plate 5 touch at the thrust section $K_0$. Unit 40 controls the flow of compressed air generated by source 13 and, by operating the pressure regulator 14, controls the pressure P of the supplied air.

The air flowing out of nozzle 27 generates a force $R=R_P$ on thin plate 5 along the thrust direction Z. The values of force $R_P$ corresponding to different values of pressure P are stored and/or processed in unit 40, as hereinafter described in more detail. On thin plate 5, force $R_P$ creates a torque with moment $M=R_P*x_o$, where $x_o$, lever arm of the torque, is the value of distance x separating section $K_o$ from the section of weakness 9 about which thin plate 5 accomplishes substantially limited angular displacements. The torque with moment M is univocally balanced by the elastic reaction of the section of weakness 9 that generates a torque with moment $M_{re}=M$, to which there corresponds an associated arrangement of thin plate 5 and, more specifically, a value of height z of slider 3.

The herein described balance condition of thin plate 5 can also be achieved by substituting force $R_P$, applied at section $K_o$, with a thrust $G_Z$ applied at slider 3 at a distance L from the section of weakness 9, that generates on thin plate 5 a torque with moment $$G_Z*L=R_P*x_0=M. \quad (1)$$

Unit 40 sends control signals to pressure regulator 14 for causing the controlled increment of pressure P, thereby increasing the values of force $R_P$ and of moment M of the torque applied to thin plate 5. For the purposes of providing, instant by instant, the balance condition of thin plate 5, it is necessary to achieve, at every value of $R_P$, a different value of the elastic deformation of the section of weakness 9 that balances the torque with moment M. In practice, further to the variation of $R_P$ and owing to the consequent, temporary unbalance of thin plate 5, the arrangement of thin plate 5 and the height of slider 3 vary until there is reached the position that corresponds to the torque $M_{re}$ necessary for restoring balance.

The position of slider 3 along direction Z, with respect to the reference surface 8 of reference base 2 is detected by the position sensor 30 that sends electric signals indicative of such position to unit 40. In unit 40 these signals are processed, together with those of the controlled pressure P, for generating and memorizing pairs of values P and z that correspond to various balance arrangements of thin plate 5. These processings can take into account off-set values generated in a calibration phase in unit 40, in a known way that is hereinafter not described for the sake of simplicity.

The signals sent by sensor 30 are checked, as pressure P varies, in unit 40 for identifying the exceeding of a value that corresponds to the pre-determined flying height $z_F$ of slider 3, and as a consequence a signal is sent by unit 40 to source 13 for controlling the stopping of the flow of compressed air.

Processings of the sequence of the pairs of memorized values P and z are carried out, more specifically interpolation operations of a known type, that enable to determine, for values of z varying in a substantially continuous way within a specific range, corresponding values of P.

Thus, the values of P enable to establish, as previously mentioned, the values of the corresponding force $R_P$ applied to thin plate 5. More specifically in the setting up phase of the apparatus, it is possible to determine, by utilizing known setting up apparatuses, like high precision balances, a correlation between the pressure values P and the values of force $R_P$ subsequently applied to thin plate 5. This correspondency is stored in unit 40, for example, in the form of a chart. In order to obtain a more accurate correspondency between pressure P and force $R_P$, the setting up operations are carried out by using thin plates with geometric and manufacturing characteristics that are identical to those of thin plates 5 that, subsequently, undergo the checking. It should be realized that the small variations in the distance separating the surface of thin plate 5 from the nozzle 27, that occur in the course of the checking (typically within a range of 0.2÷0.3 mm) do not affect in a significant way the correspondency between air pressure and applied force.

Therefore, it is possible to identify, at the flying height $z_F$, a pressure value $P_F$ and a value $R_{PF}$ of the applied force and obtain, on the basis of (1), the desired force value:

$$G_L = (R_{PF} * x_0)/L = M_F/L, \quad (2)$$

where $M_F$ is the value of the moment of the torque applied at $z_F$.

From the foregoing description, it is clear how the checking operations are carried out in a simple and completely automatic way. It is also clear how an apparatus according to the invention, with the appropriate design, can be utilized in an extremely flexible way for the checking of pieces of different type and that have different dimensions, and without there being the need to carry out complex setting up operations for mechanically defining the flying height $z_F$ at which carry out the gram load check: in fact, the height $z_F$ is obtained in a dynamic way, by the detectings of the position sensor 30 and the subsequent processings in unit 40.

It should be realized that different stiffness features of the various component parts of thin plate 5 that depend on the specific shape of thin plate 5 itself, or possible variations in the position of the section of weakness 9, or other differences in the deformation of thin plate 5 with respect to the theoretic behaviour defined by (1) can be considered practically negligible. However, should there be required an extremely high standard of precision, it is obviously possible to keep it into account and attain the gram load value by carrying out evidently more complex processings that fall within the scope of the invention.

The particularly agile and plain structure of the apparatus enables, among other things, the modularity in more complex systems.

Figure 3:
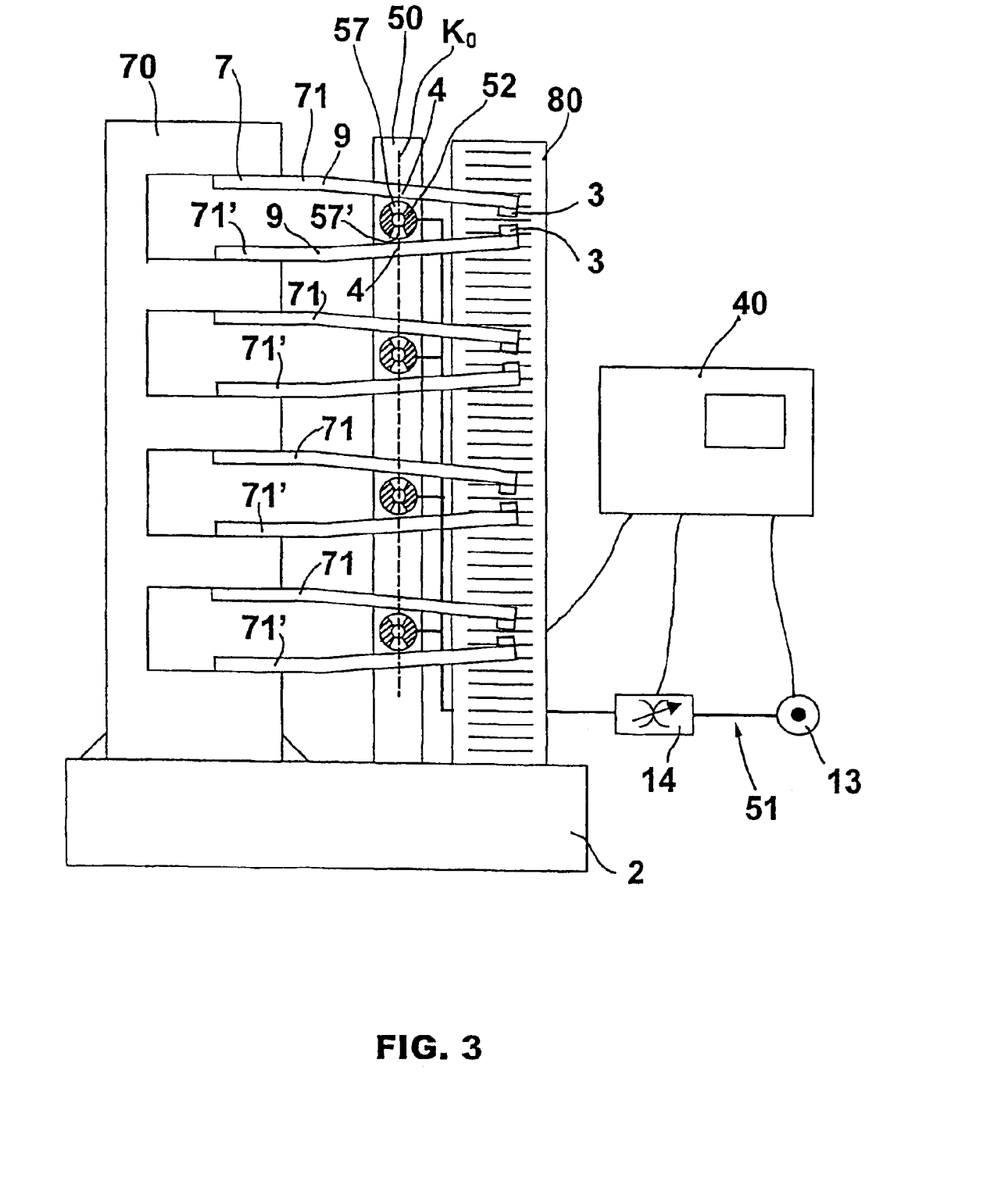
FIG. 3 is a schematic side view of an apparatus according to a different embodiment of the invention, for simultaneously checking a plurality of parts.

FIG. 3 shows, for example, an apparatus that can simultaneously check the gram load values of all the HGA pairs 71, 71' that, coupled to a single E-block 70, apply thrust forces in two opposite directions.

The apparatus of FIG. 3 is conceptually similar to the one shown in FIG. 1, and includes a support 50 to which there are coupled tubular elements 52 each including two pneumatic nozzles 57, 57', oppositely arranged and coupled to a pneumatic circuit 51.

The operation is substantially identical to that described with reference to FIGS. 1 and 2, with the only difference that, in the course of a single flow of compressed air from circuit 51, in unit 40, that controls the pressure P of the supplied air and receives electric signals from a position sensor 80 (for example of the optoelectronic type), there are detected and memorized values of P and of all the heights $z_{71}$, $z_{71'}$ relating to all the HGAs 71, 71' and there occur substantially simultaneous processings for detecting the associated gram load values.

Obviously, an apparatus like the one illustrated in FIG. 3 enables to carry out, by suitably and easily modifying the conduits of the pneumatic circuit 51, the checking in sequence of the gram load of the various HGAs 71, 71' coupled to the E-block, or at two different moments in time, for example the thin plates 71 oriented in an identical direction and the thin plates 71' oriented in the opposite direction, or pairs of thin plates 71 and 71' not adjacent to each other. This latter possibility is advantageous in the event that, owing to the small dimensions or in any case the geometric characteristics of the specific HGA to be checked, the oppositely arranged thin plates 71, 71' coupled to an identical wing of the E-block run the risk of reciprocally contacting each other when they both undergo the simultaneous and oppositely directed air thrust.

It should be realized that the pieces to be checked and the component parts of the apparatuses are illustrated in the figures in an extremely schematic way, and that the dimensions and the shapes do not correspond in an accurate way to the real ones. For example, the distances existing between the nozzles 27, 57, 57' and the surfaces of thin plates 5, 71, 71' are clearly exaggerated insofar as dimensions are concerned, for the sake of simplicity and for rendering more evident some primary features of the invention.

Apparatuses according to the invention can also include manufacturing aspects that differ from what has been described and illustrated in a schematic way in FIGS. 1, 2 and 3, more specifically insofar as the thrust devices are concerned, that can comprise mechanical component parts like, for example, a first class lever for every thin plate to be checked, the lever having an end in contact with the intermediate portion 4 at section $K_0$, and suitable devices (pneumatic, mechanic or of other type) for applying a controlled and variable thrust to the opposite end.

Another possibility according to the invention foresees to apply a constant force $R_C$ (for example by means of air blown at constant pressure $P_C$) at section $K_0$, to evaluate the subsequent displacement of slider 3 and the achieved height $z_C$, and to determine, by processings that take into account the stiffness features of thin plate 5, value $R_{PF}$ of force $R_P$ necessary for reaching height $z_F$, in order to thereafter calculate the gram load value $G_L$ by means of (2), as previously described.

According to a still further possibility, instead of applying force $R_P$ to the intermediate portion 4, it is applied to the free end 6 or to the actual slider 3. In this latter case $x_0$=L, and the value of the gram load $G_L$ is immediately obtainable by the detecting of force $R_F$.

Furthermore, apparatuses according to the invention may include mechanic devices of a known type for adjusting the position $x_0$ of section $K_0$ whenever the geometric and manufacturing characteristics of thin plates 5 to be checked vary.

Figure 4:
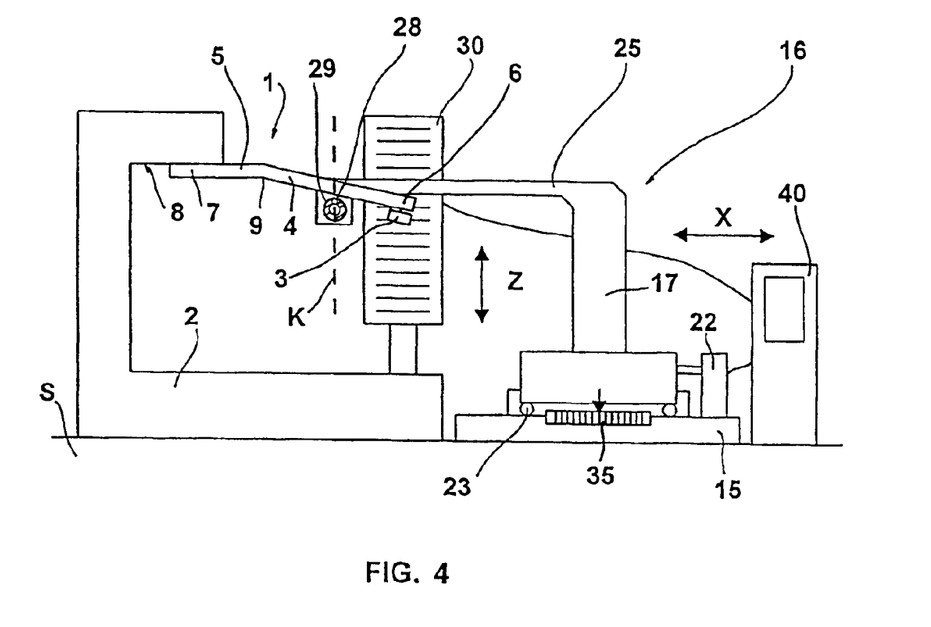
FIG. 4 is a schematic side view of an apparatus according to a third preferred embodiment of the invention.
Figure 5:
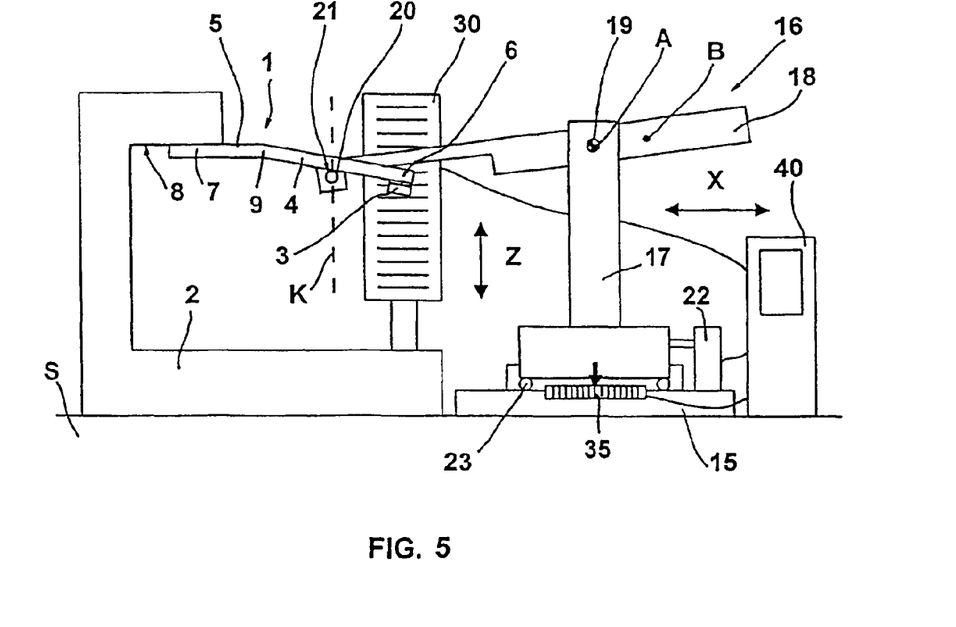
FIG. 5 is a schematic side view of an apparatus according to a fourth preferred embodiment of the invention.
Figure 6:
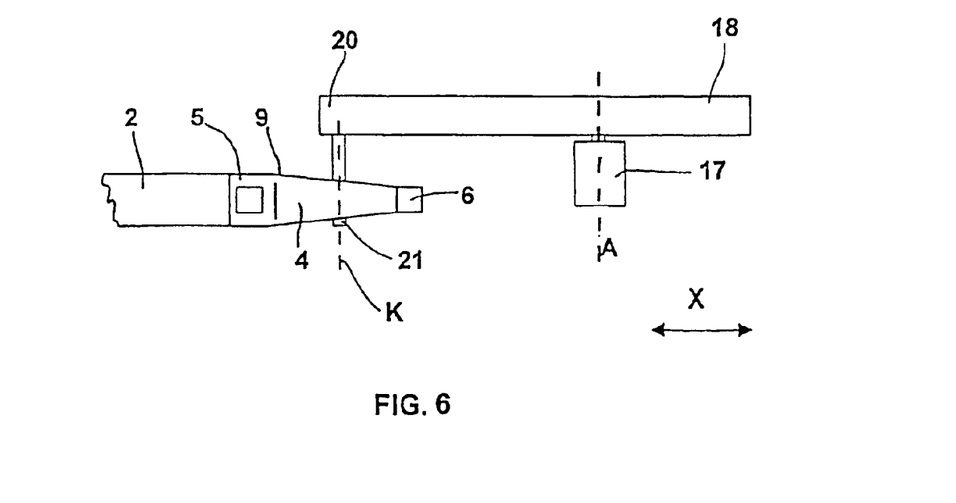
FIG. 6 is a top view showing some details of the apparatus of FIG. 5.

FIGS. 4, 5 and 6 show, in an extremely schematic way, apparatuses according to alternative embodiments of the present invention. In such alternative embodiments, too, the elastic element 1 is coupled to the reference base 2 in substantially the same way as shown and described above with reference to the embodiment of FIG. 1.

The apparatuses of FIGS. 4, 5 and 6 include a support frame 15 carrying an arm-set 16, movable along an adjustment direction X, including a support slide 17 with a thrust device.

A drive motor 22 and a guide device, identified by reference number 23 in FIGS. 4 and 5, cause and guide translation displacements of support slide 17 on frame 15 along the direction X, respectively.

Detecting devices include, in addition to the position sensor 30 of FIG. 1, a further position sensor 35, coupled to support frame 15, that generates electric signals indicative of the position, along an adjustment direction X, of arm-set 16 with respect to frame 15. The sensor 35 can be achieved by utilizing an optoelectronic linear transducer ("encoder") of a known type. As an alternative, it can be achieved by means of a rotary encoder associated to motor 22, according to the per se known arrangement shown in the previously mentioned International patent application published with No. WO-A-9924785.

The drive motor 22 and the further position sensor 35, as well as sensor 30, are connected to the memorizing, processing and control unit 40.

The reference base 2, to which there is coupled elastic element 1, and support frame 15, carrying arm-set 16, are coupled to a common bed, schematically shown and identified by reference letter S in FIGS. 4 and 5, in a known herein not described way that enables to fix, when the apparatus is in operation, a mutual position between base 2 and frame 15.

In the apparatus shown in FIG. 4, the thrust device carried by slide 17 includes a pneumatic nozzle 28 achieved, for example, in the end part of a tubular element 29 coupled to the end of an arm 25 rigidly fixed to slide 17. The pneumatic nozzle 28 is connected, in a known and herein not illustrated way, to a pneumatic circuit—the latter being on its turn connected the memorizing, processing and control unit 40—with a source of compressed air and suitable conduits and throttle elements (also known and herein not shown) which determine that the pressure of the air output by nozzle 28 be constant.

The operation of the apparatus of FIG. 4 is as follows.

The mutual position between support frame 15 and base 2 is defined, for example, by means of mechanical precision references. Before the checking operations are carried out, there are removable abutments that keep thin plate 5 in a retracted position. Further to the removal of said abutments (not shown in the figures), the surface of the tubular element 29 and thin plate 5 touch at a thrust section K. The unit 40 controls the supply of compressed air with constant pressure from nozzle 28, causing a substantially constant force R=$R_0$ on the intermediate portion 4 of the thin plate 5 at the thrust section K.

The force $R_0$ generates, on thin plate 5, a torque with moment M=$R_0$*$x_K$, where $x_K$, lever arm of the torque, is the value of the distance x separating section K from the section of weakness 9 about which thin plate 5 accomplishes substantially limited angular displacements. The torque with moment M is univocally balanced by the elastic reaction of the section of weakness 9 that generates a torque with moment $M_{re}$=M, to which there corresponds an associated arrangement of thin plate 5 and, more specifically, a value of height z of slider 3.

As stated above in connection with the embodiment of FIG. 1, the herein described balance condition of thin plate 5 can also be achieved by substituting force $R_0$, applied at section K, with a thrust $G_Z$ applied at slider 3 at a distance L from the section of weakness 9, that generates on thin plate 5 a torque with moment $$G_Z*L=R_0*x_K=M. \quad (3)$$

Unit 40 sends control signals to drive motor 22 for causing translation displacements of the support slide 17 with respect to frame 15, guided by device 23 along direction X. In the course of these translation displacements, the position of nozzle 28 along direction X varies, by operating in sequence at different sections K of the thin plate 5, thus altering the distance $x_K$ between the thrust section and the section of weakness 9. For the purposes of providing, instant by instant, the balance condition of thin plate 5, it is necessary to achieve, at every value of $x_K$, a different value of the elastic deformation of the section of weakness 9 that balances the torque with moment M. In practice, further to the variation of $x_K$ (contact at a different section K) and owing to the consequent, temporary unbalance of thin plate 5, the position of thin plate 5 and, more specifically, the height of slider 3, vary until there is reached the position that corresponds to the torque $M_{re}$ necessary for restoring balance. It is pointed out that, as previously cited with reference to FIG. 1, the distance separating the surface of thin plate 5 from the nozzle 28 undergoes variations caused by temporary unbalances of thin plate 5. However, such variations are small (typically within a range of 0.2÷0.3 mm) and substantially negligible, and do not affect in a significant way the constancy of the value of force $R_0$.

The position of the support slide 17 on frame 15 along direction X and that of slider 3 along direction Z with respect to the reference surface 8 of reference base 2, are detected by the position sensors 35 and 30, respectively, that send electric signals indicative of such positions to unit 40. In unit 40 these signals are processed for generating and memorizing pairs of values $x_K$ and z that correspond to various balance arrangements of thin plate 5. These processings can take into account off-set values generated in a calibration phase in unit 40, in a known way that is hereinafter not described for the sake of simplicity.

The signals sent by sensor 30 are checked, in the course of the translation displacements of support slide 17, in unit 40 for identifying the exceeding of a value that corresponds to the pre-determined flying height $z_F$ of slider 3, and as a consequence a signal is sent by unit 40 to motor 22 for controlling the stopping of the translation displacement of the support slide 17.

Processings of the sequence of the pairs of memorized values $x_K$ and z are carried out, more specifically interpolation operations of a known type, that enable to determine, for values of z varying in a substantially continuous way within a specific range, corresponding values of $x_K$.

It is identified a value $x_{pF}$ of $x_K$ at the flying height $z_F$, and calculated, on the basis of (3), the desired force value:

$$G_L=(R_0*x_{pF})/L=M_F/L, \quad (4)$$

where $M_F$ is the value of the moment of the torque applied at $z_F$.

In substance, according to both equations (2) and (4) above, the value of force $G_L$ is obtained as the ratio between the moment $M_F$ of a variable torque applied to thin plate 5 at the flying height $z_F$ and a constant value (distance L between slider 3 and section of weakness 9). According to the apparatus of FIG. 1, variations of the torque and relevant moment M are caused by variations of pressure P and, consequently, force $R_P$, while the lever arm $x_0$ is constant (see equation (1)). In the apparatus of FIG. 4 the applied force $R_0$ is constant, whereas the lever arm $x_K$ of the torque is varied, consequently varying the corresponding moment M (see equation (3)).

In other words, the gram load value $G_L$ is obtained in the former case (FIG. 1) by identifying a specific value of force $R_F$, i.e. of corresponding pressure $P_F$, and in the latter case (FIG. 4) by detecting a proper value $x_{pF}$ of the lever arm of the applied torque, i.e. a corresponding position of slide 17.

The apparatus shown in FIGS. 5 and 6 includes a different thrust device, allowing to obtain the value of gram load $G_L$ by means of equation (4). Such thrust device includes a lever 18 and a fulcrum 19, for example with a ball bearing, between lever 18 and support slide 17, that defines an axis of mutual rotation A. An end 20 of lever 18 defines a rest surface 21, for example with a cylindrical shape, that contacts the intermediate portion 4 of element 1 at a thrust section K.

The center of gravity of lever 18, identified by reference letter B in FIG. 5, is located apart from axis A of fulcrum 19, at a distance $d_B$ along direction X. Consequently, lever 18 is subject to an unbalance torque $C_s=G_B*d_B$, where $G_B$ is the weight of the lever.

The value of $C_s$ remains substantially constant when there occur variations of a limited entity of the inclination of lever 18 with respect to slide 17, i.e., variations that enable to disregard displacements in the position of the center of gravity B with respect to fulcrum 19 along direction X.

As cited above, the operation of the apparatus shown in FIGS. 5 and 6 is similar to the one of FIG. 4, apart from a different way to apply the constant force $R_0$.

More specifically, before the checking operations are carried out, there are removable abutments that keep thin plate 5 and lever 18, respectively, in a retracted position. Further to the removal of said abutments (not shown in the figures), rest surface 21 and thin plate 5 touch at a thrust section K, and thin plate 5 and lever 18 apply mutual forces along the thrust direction Z. More specifically, the unbalance torque $C_s$ generates a substantially constant force that the end 20 of lever 18 applies to thin plate 5 (from the bottom upwards in the schematic view shown in FIG. 5) with value $R_0=C_s/d_E$, where $d_E$ is the substantially constant distance along direction X, between axis A of fulcrum 19 and the surface 21 (i.e. the thrust section K). As cited above with reference to FIG. 4, force $R_0$ generates, on thin plate 5, a torque with moment $M=R_0*x_K$. The torque with moment M is univocally balanced by the elastic reaction of the section of weakness 9 that generates a torque with moment $M_{re}=M$, to which there corresponds an associated position of thin plate 5 and, more specifically, a value of height z of slider 3.

When unit 40 sends control signals to drive motor 22 for causing translation displacements of the support slide 17 with respect to frame 15, rest surface 21 slides on the surface of thin plate 5, by operating in sequence at different sections K of the latter, thus altering the distance $x_K$ between the thrust section and the section of weakness 9. Further to the variation of $x_K$ (contact at a different section K) and owing to the consequent, temporary unbalance of thin plate 5, the position of thin plate 5 and, more specifically, the height of slider 3, vary until there is reached the position that corresponds to the torque $M_{re}$ necessary for restoring balance.

In the apparatus of FIG. 5, too, the position of the support slide 17 on frame 15 along direction X and that of slider 3 along direction Z with respect to the reference surface 8 of reference base 2, are detected by the position sensors 35 and 30, respectively, that send electric signals indicative of such positions to unit 40. In unit 40 these signals are processed for generating and memorizing pairs of values $x_K$ and z that correspond to various balance arrangements of the system including lever 18 and thin plate 5.

The signals sent by sensor 30 are checked, in the course of the translation displacements of support slide 17, in unit 40 for identifying the exceeding of a value that corresponds to the pre-determined flying height $z_F$ of slider 3, and as a consequence a signal is sent by unit 40 to motor 22 for controlling the stopping of the translation displacement of the support slide 17.

After having carried out known interpolation operations of a known type, it is identified a value $x_{pF}$ of $x_K$ at the flying height $z_F$, and calculated, by applying the equation (4), the desired force value $G_L$.

The appropriate design of the apparatus of FIGS. 5 and 6 simply involves a suitable choice of the values of $G_B$ (weight of lever 18), of $d_B$ (position of the center of gravity B with respect to fulcrum 19), and of $d_E$ (distance between the rest surface 21 and fulcrum 19), and of a variability range of $x_K$ to which there corresponds a range of values of the height z that includes the pre-set flying height $z_F$ to be identified. In this connection, a variant with respect to what has been herein described can foresee that the stopping of the translation of slide 17 be controlled when the value $x_K$ corresponds to a limit of its pre-fixed variability range.

It is appropriate to emphasize that in the course of the normal operation of the apparatus, the angular arrangement of lever 18 about axis A varies within an extremely limited range (typically of a few degrees) that enables to consider the unbalance torque $C_s$ and the force $R_0$ applied by lever 18 substantially constant (as previously stated) and to disregard the components of the force applied by thin plate 5 to arm 18 apart from those along direction Z.

The apparatuses shown in FIGS. 4, 5 and 6, too, enable, among other things, to be modularly composed in more complex systems, substantially corresponding to the arrangement of FIG. 3 or as disclosed in the formerly mentioned International patent application published with No. WO-A-0016056, for example for the simultaneous checking, with a single translation displacement of a slide carrying a plurality of thrust devices, of the gram load values of all the HGA coupled to a single E-block.

Moreover, other apparatuses according to the invention can include manufacturing aspects that differ from what has been described and illustrated in a schematic way, for example with reference to the embodiment shown in FIGS. 5 and 6, insofar as the rest surface 21 is concerned, that can have a spheric or another shape, or insofar as the arrangement of lever 18 with respect to the elastic element 1 is concerned. With particular regard to this latter aspect, a possible alternative can foresee that the lever be arranged at 90° with respect to what has been illustrated, so that slide 17 translates on frame 15 along the identical direction X shown in FIG. 1, but that axis A, defined by fulcrum 19, be substantially parallel to the same displacement direction X.

The herein described apparatuses are particularly flexible in use and can be part of more complex systems, in which different characteristics of the E-block and/or of the HGAs are checked on the same piece, for example a suitably positioned HSA.

An apparatus and method according to the present invention can also be utilized for the checking of pieces that differ from the HGAs, that however include at least an elastic element of which it is desired to check the thrust force.

What is claimed is:

1. Apparatus for checking the force applied by a thin plate including a locking portion, stationary with respect to a reference base, a section of weakness near the locking portion, an intermediate portion and a free end carrying a slider, comprising:
   a support, coupled to the reference base;
   a thrust device, coupled to the support and adapted for applying a reference force to the thin plate, substantially along a thrust direction, at a thrust section;
   detecting devices with at least one position sensor adapted to cooperate with the free end of the thin plate and provide electric signals indicative of the position of the slider along the thrust direction; and
   a memorizing, processing and control unit connected to said at least one position sensor and adapted to detect, on the basis of the signals of said at least one position sensor, the mutual position, along the thrust direction, existing between the locking portion and the slider, and process a value of the force to be checked on the basis of the value of said reference force and of the position of the thrust section at a pre-determined mutual position along the thrust direction, the thrust device being adapted to cooperate with the thin plate without touching said free end at said pre-determined mutual position.

2. The apparatus according to claim 1, wherein said reference force applies a torque to the thin plate, said torque having a lever arm which is the distance between said thrust section and said section of weakness, and wherein the memorizing, processing and control unit is adapted for processing a value of the force to be checked according to the following formula:

$$G_L = M_F/L$$

where $M_F$ is the value of the moment of said torque at said predetermined mutual position along the thrust direction and L is the distance between the slider and the section of weakness.

3. The apparatus according to claim 1, wherein said thrust section is included in the intermediate portion of the thin plate.

4. The apparatus according to claim 3, wherein the memorizing, processing and control unit is adapted to obtain a value of the force to be checked on the basis of the distances separating the section of weakness of the slider from the thrust section.

5. The apparatus according to claim 1, wherein said position of the thrust section is fixed with respect to the section of weakness of the thin plate, and the thrust device is adapted for varying the reference force applied to the thin plate, and wherein the memorizing, processing and control unit is adapted for detecting the value of the reference force at said pre-determined mutual position.

6. The apparatus according to claim 5, wherein the thrust device includes a pneumatic nozzle stiffly coupled to the support, arranged near the thin plate at said thrust section, for applying said reference force to the thin plate.

7. The apparatus according to claim 6, wherein the thrust device includes a pneumatic circuit coupled to said nozzle, a source of compressed air and a device for controlling pressure of the compressed air supplied by the source.

8. The apparatus according to claim 7, wherein the memorizing, processing and control unit is connected to the pressure control device for detecting values of the pressure that correspond to different positions of the slider along the thrust direction, and is adapted for identifying corresponding values of said reference force on the basis of stored data.

9. The apparatus according to claim 1, wherein said support is movable with respect to the reference base and said detecting devices include a second position sensor adapted to provide electrical signals indicative of the position of the thrust section along an adjustment direction, and the thrust device is adapted to apply said reference force to the thin plate as a constant reference force, and wherein the memorizing, processing and control unit is adapted for detecting the value of the distance between the thrust section and the section of weakness at said pre-determined mutual position.

10. The apparatus according to claim 9, wherein the thrust direction is substantially vertical and the adjustment direction is substantially horizontal.

11. The apparatus according to claim 9, wherein the thrust device includes a pneumatic nozzle rigidly coupled to the support, arranged near the intermediate portion of the thin plate at said thrust section, for applying said substantially constant reference force to the thin plate.

12. The apparatus according to claim 9, wherein the thrust device includes a lever, coupled to the support by means of a fulcrum, that defines an axis of mutual rotation, with a rest surface for contacting the thin plate at said thrust section, the lever defining an unbalance torque adapted for urging the rest surface towards the thin plate to be checked for applying said substantially constant reference force.

13. The apparatus according to claim 12, wherein the center of gravity of said lever is located at a pre-set distance that differs from zero, along a horizontal direction, from the axis of mutual rotation defined by the fulcrum, said unbalance torque being generated by the weight of the lever.

14. The apparatus according to claim 13, wherein the rest surface of the lever has a substantially cylindrical shape.

15. The apparatus according to claim 9, including a drive motor coupled to the support and adapted for causing translation displacements of the support with respect to the base along an adjustment direction.

16. The apparatus according to claim 15, wherein the memorizing, processing and control unit is connected to the drive motor for controlling the starting and the stopping of said translation displacements of the support with respect to the base.

17. The apparatus according to claim 1, wherein said at least one position sensor includes an optoelectronic measuring system.

18. The apparatus according to claim 1, wherein the thrust device is adapted for applying a constant reference force to the thin plate, and wherein the memorizing, processing and control unit is adapted for processing the values of said constant reference force and said mutual position detected along the thrust direction, for obtaining the value of the force necessary for attaining said pre-determined mutual position between the locking portion and the slider.

19. The apparatus according claim 1, further adapted for checking of the force applied by a plurality of thin plates coupled to a single element, including a plurality of thrust devices coupled to the support and adapted for applying reference forces to the plurality of thin plates at a single thrust section, wherein said at least one position sensor is adapted to provide electric signals indicative of the positions of all the sliders of the plurality of thin plates.

20. The apparatus according to claim 19, wherein the thrust devices include pneumatic nozzles rigidly coupled to the support, arranged near the intermediate portions of the plurality of thin plates at said thrust section, for applying said reference forces to the plurality of thin plates, and a pneumatic circuit coupled to said nozzles, with a source of compressed air and a device for controlling the pressure of the air supplied by the source.

21. Method for measuring a force generated by a thin plate at a pre-set elastic deformation, the thin plate having a locking portion, stationary with respect to a reference base, a section of weakness near the locking portion, an intermediate portion and a free end carrying a slider, the method comprising:

applying a force to the thin plate, at a thrust section and along a thrust direction, and a corresponding torque with a variable moment to the thin plate with reference to the section of weakness;

detecting the occurrence of a pre-determined mutual position, along the thrust direction and as a consequence of the force applied, between the locking portion and the slider, said pre-determined mutual position defining the pre-set elastic deformation of the thin plate;

causing variations of the moment of said torque;

detecting the value of the moment of said torque at said pre-set elastic deformation of the thin plate; and calculating the force generated by the thin plate on the basis of the value of the moment detected at said pre-set elastic deformation of the thin plate, and of the position of the thrust section and of the slider with respect the section of weakness.

22. The method according to claim 21, wherein the step of calculating the force generated by the thin plate includes the performing of the following calculation $$G_L = M_F/L$$

that corresponds to a balance arrangement of the thin plate, where $M_F$ is said value of the moment at said pre-set elastic deformation of the thin plate and L is the distance between the slider and the section of weakness.

23. The method according to claim 21, wherein the variations of the moment of said torque are caused by increasing pressure of air supplied by a source and applying said force at said thrust section, the method further comprising:

retrieving and memorizing, on the basis of signals provided by at least one sensor to a memorizing, processing and control unit as the applied force varies, pairs of values relative to positions of the slider along the thrust direction and relative values of the pressure of the air supplied by the source;

processing said pairs of values by interpolation in order to obtain further pairs of values at intermediate positions with respect to those retrieved;

evaluating the value of pressure which corresponds to the position of the slider in the pre-set elastic deformation of the thin plate; and detecting the value of the applied force corresponding to the value of the evaluated pressure.

24. The method according to claim 21, further comprising:

bringing a thrust device into cooperation with the intermediate portion of the thin plate at said thrust section;

causing translation displacements of a movable support carrying the thrust device with respect to the base along an adjustment direction with consequent displacements of said thrust section with respect to the section of weakness of the thin plate;

detecting, on the basis of signals provided by at least one position sensor, position of the slider along the thrust direction corresponding to the pre-set elastic deformation of the thin plate;

evaluating, on the basis of signals sent by a second position sensor, position, along the adjustment direction, of said thrust section with respect to the section of weakness which corresponds to said position of the slider corresponding to the pre-set elastic deformation of the thin plate; and calculating the force generated by the thin plate on the basis of said position of the thrust section along the adjustment direction.

25. The method according to claim 24, further comprising:

retrieving and memorizing, on the basis of the signals sent by said position sensors to a memorizing, processing and control unit in the course of the translation displacements of the support, pairs of values that correspond to the position of the slider and that of the thrust section, along the thrust direction and the adjustment direction, respectively; and processing said pairs of values by interpolation in order to obtain additional pairs of values at intermediate positions with respect to those retrieved;

wherein the step of detecting the position of the slider which corresponds to the pre-set elastic deformation of the thin plate includes the checking of that said position is included within the retrieved and memorized position values.

* * * * *